E. R. CALTHROP.
PARACHUTE LAUNCHING DEVICE.
APPLICATION FILED SEPT. 13, 1917.

1,274,679.

Patented Aug. 6, 1918.
3 SHEETS—SHEET 1.

Everard Richard Calthrop.
INVENTOR

WITNESSES

E. R. CALTHROP.
PARACHUTE LAUNCHING DEVICE.
APPLICATION FILED SEPT. 13, 1917.

1,274,679.

Patented Aug. 6, 1918.
3 SHEETS—SHEET 2.

WITNESSES

Everard Richard Calthrop
INVENTOR

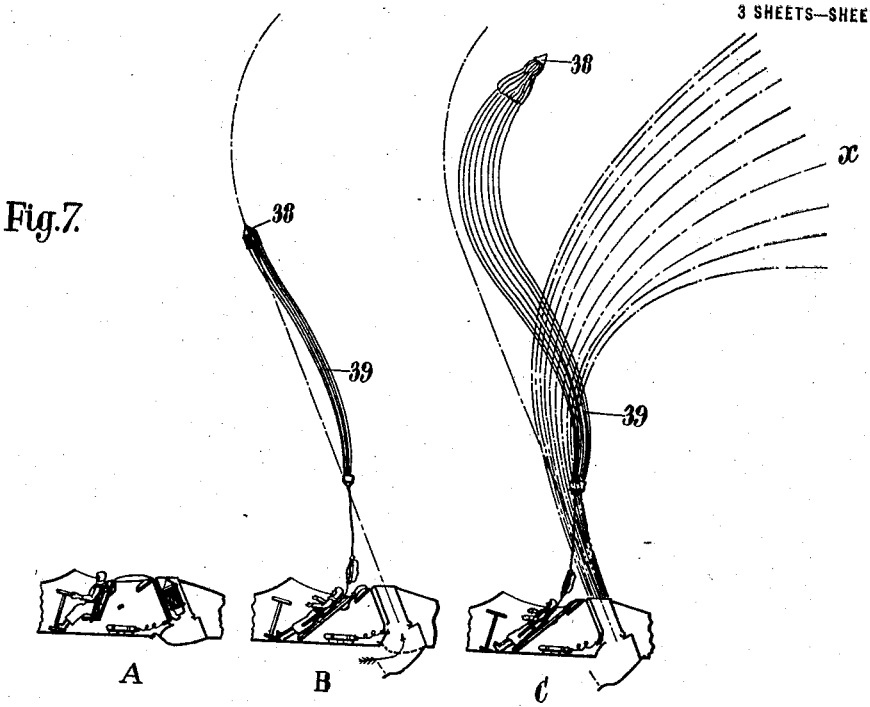
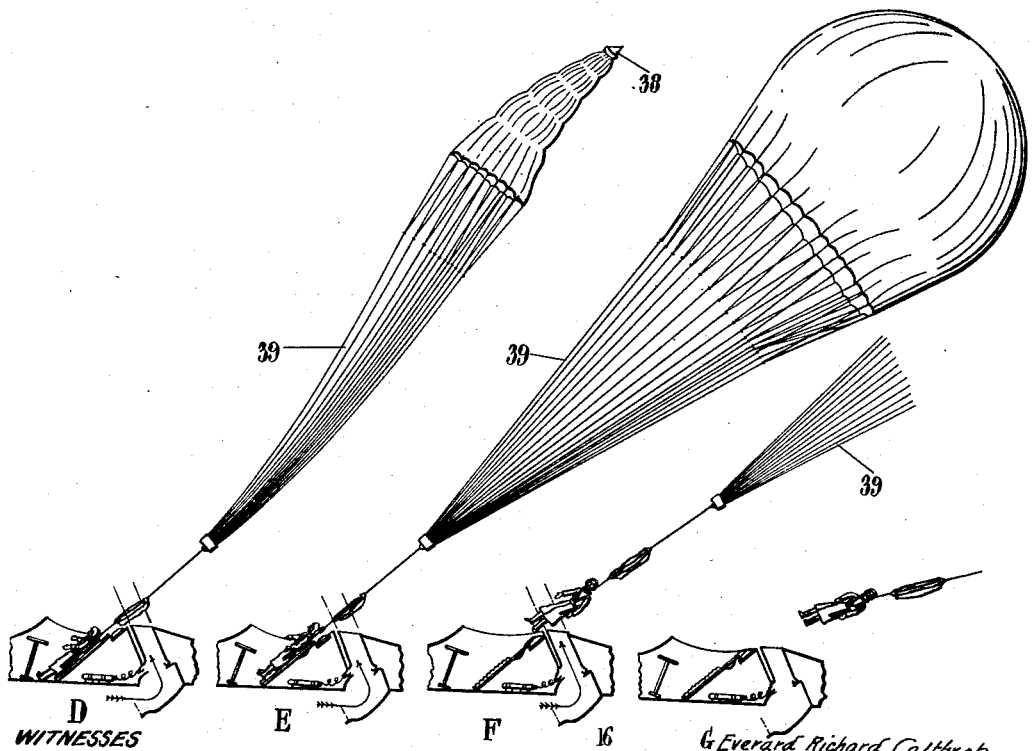

UNITED STATES PATENT OFFICE.

EVERARD RICHARD CALTHROP, OF LONDON, ENGLAND.

PARACHUTE-LAUNCHING DEVICE.

1,274,679.　　　Specification of Letters Patent.　　Patented Aug. 6, 1918.

Application filed September 13, 1917. Serial No. 191,288.

*To all whom it may concern:*

Be it known that I, EVERARD RICHARD CALTHROP, a subject of the King of Great Britain, residing at London, in the county of Middlesex, England, have invented new and useful Improvements Relating to Parachute-Launching Devices, of which the following is a specification.

This invention has reference to devices for launching parachutes from aircraft of the kind in which the parachute and its rigging are compactly nested in a container and adapted to be ejected therefrom by admitting air under pressure to said container.

In launching apparatus of this kind the parachute and its associated parts are projected upward clear of the aircraft by the charge of compressed air until it is arrested by the weight of the aviator to whom it is attached and who is thus dragged out of his seat when the parachute body expands and it is known to augment the blast of air introduced to the container from a compressed air reservoir by the external air, said means comprising an injector device associated with the nozzle through which the air under pressure is admitted to the container, and while the present invention also contemplates the utilization of the external air in the projection of the parachute it is to be distinguished from known devices in that an injector in the usual acceptance of the term is altogether dispensed with.

The present invention is also to be distinguished from prior proposals in which a parachute is ejected from a container on the aircraft by air introduced through a funnel or box so that in the event of the aircraft falling at an excessive speed the parachute will be extended to steady the descent of the aircraft.

The objects of the present invention are to provide an improved parachute launching device of the type above referred to and to provide improved means for facilitating the rapid and easy detachment of the aviator from the aircraft without danger of his fouling any part of the machine.

With these objects in view and such others as may hereinafter appear or are incidental thereto my invention in its broadest aspect may be said to be embodied in a conpect construction of the aforesaid kind in which the body of air resisting the aircraft during its flight is utilized to eject or assist in ejecting the normally nested parachute body and its associated parts from its container and in which the detachment or withdrawal from the aircraft of the airman or aviator to whom the parachute is attached is effected by the pull of the expanding parachute.

More specifically regarded the invention consists in the provision of means associated with the container in which the parachute is normally nested whereby the air through which said aircraft is moving is collected and caused to enter the container and project or assist in projecting the parachute body and its associated parts therefrom. Also in the provision of means whereby the aviator is rapidly and safely detached from the aircraft by the pull of the ejected parachute all as will be hereinafter more particularly described.

In order that my invention may be readily understood and carried into effect I will proceed to describe the same fully for which purpose reference is to be had to the accompanying drawings in which:—

Figs. 3, 4 and 5 illustrate details of construction hereinafter referred to.

Fig. 7 represents a series of diagrams designated A, B, C, D, E, F and G illustrating the successive stages of operation of the device shown in Fig. 6.

Figure 1:
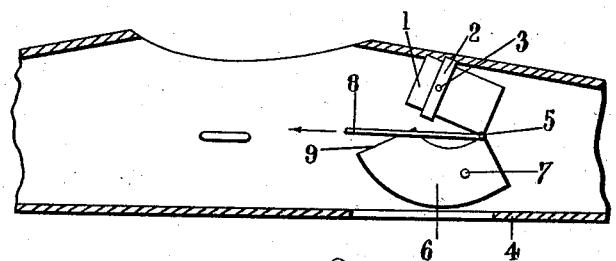
Figures 1 and 2 illustrate diagrammatically a parachute launching device embodying my invention in its most elementary form.
Figure 2:
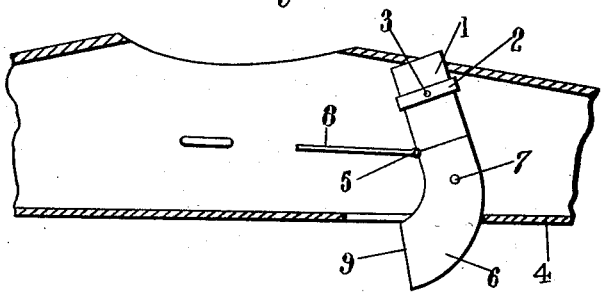

Referring now to Figs. 1 and 2 which illustrate my invention in its most simple form the container 1 in which the parachute body and its rigging is compactly nested is slidably mounted in an annular collar 2 which is adapted to pivot about the trunnions 3 suitably supported within the fuselage 4 of the aeroplane. Hinged to the container 1 at 5 is a tubular trumpet-like member 6 pivoted within the fuselage at 7 and having pivoted thereto a rod 8 which latter is adapted to be manipulated by the occupant of the aeroplane. With the parts in the position illustrated in Fig. 1 the mouth 9 of the member 6 is shielded within the fuselage of the aeroplane the container 1 also occupying a position well below the stream-line body of the fuselage to the end of reducing head resistance during flight. When a descent is to be made the rod 8 is pulled by the aviator thus turning the member 6 about its pivot 7 causing the mouth of the container 1 to be elevated and simultaneously projecting the trumpet like member 6 below the bottom of the fuselage so that its mouth 9 will be directed toward the oncoming current of air resisting the aeroplane in its flight through the atmosphere plus the propeller current. This air which will be at considerable pressure will thus be collected by the member 6 and conducted to the interior of the container 1 thus causing the nested parachute and its associated parts to be ejected from the container.

Figure 3:
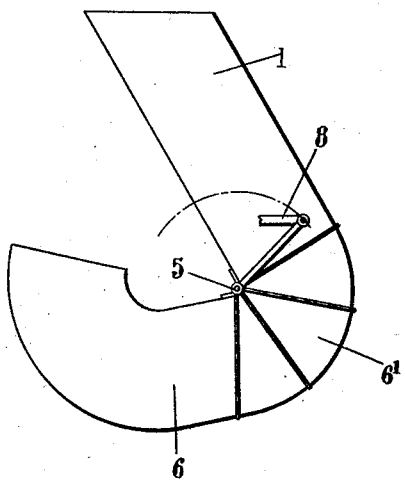
Figure 4:
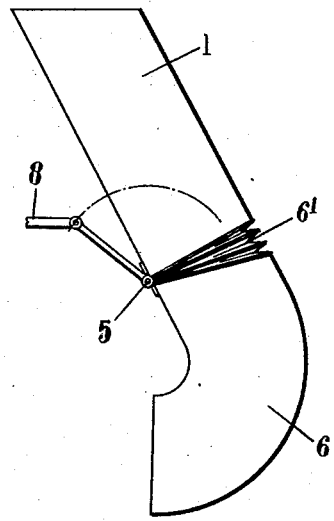
Figure 5:
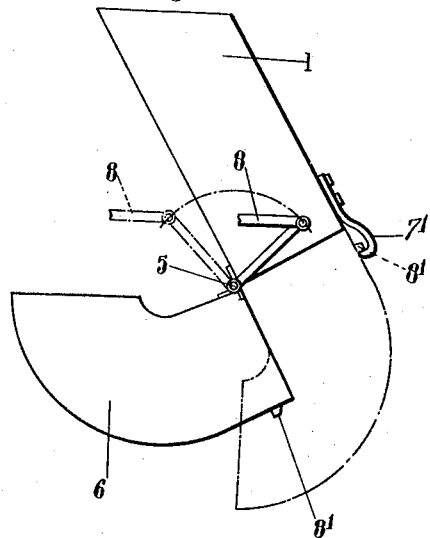

Figs. 3, 4 and 5 illustrate modified constructions of the two members 1 and 6. Figs. 3 and 4 show a collapsible connection 6' of flexible material between the two members to secure a substantially air-tight joint when the trumpet like member 6 is in the position illustrated in Fig. 4 and Fig. 5 shows a locking device comprising a spring catch 7' secured to the container 1 and adapted to engage the projection 8' on the member 6 when in the position indicated by the broken chain lines to lock and hold it in the operative position.

Figure 6:
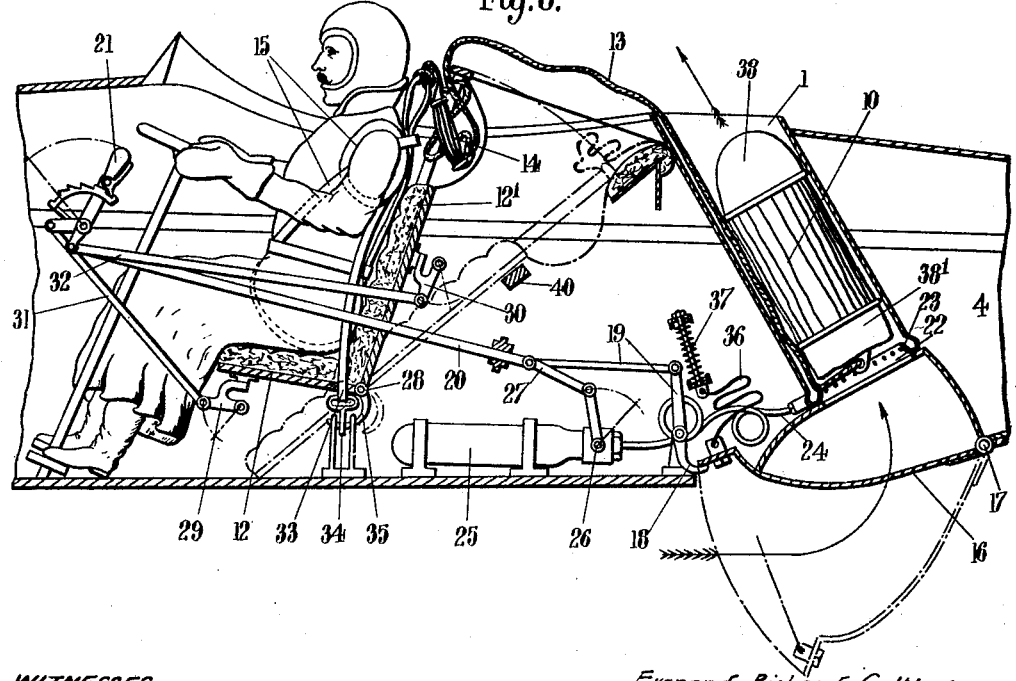
Fig. 6 represents a sectional view of a portion of the fuselage of an aeroplane showing the preferred form of my invention applied thereto.

As above stated the device so far described embodies my invention in its most elementary form and serves merely to illustrate the fundamental principle underlying the invention but the preferred construction and appendant refinements of detail all contributing to the production of the improved parachute launching apparatus is illustrated in Fig. 6. In this construction the cylindrical container 1 within which the pleated and folded parachute 10 and its associated parts is nested is mounted in an angular position within the fuselage 4 of the aeroplane behind the pilot's seat 12 the particular construction of which latter will presently be described. The parachute 10 is secured to the pilot by means of the main suspension rope 13, shock absorbing device 14 and harness 15.

A portion of the lower floor of the fuselage 4 is cut away to form an aperture beneath the lower end of the container 1 and a curved flap or door 16 is hinged at 17 to said fuselage to normally close said aperture said door being locked in the closed position by a catch 18 operated through links 19, 19 from a rod 20 and operating lever 21 under control of the pilot or aviator.

The lower portion of the container 1 is provided with an inwardly and upwardly directed flange 22 so as to form an annular space 23 which is in communication by means of a pipe 24 with a reservoir 25 containing air under pressure the admission of which to the container 1 is controlled by a cock 26 adapted to be actuated through links 27, 27 and the aforementioned rod 20 which as above stated is under the pilot's control.

Now it is an important feature of the present invention that when the parachute is projected clear of the aeroplane in the manner hereinafter to be more fully explained the pilot is safely and rapidly detached from the aircraft by the direct pull of the expanded parachute and I will now proceed to a consideration of the means I prefer to adopt to this end. The pilot's seat is in two portions 12 and 12' hinged together as at 28 the two portions being retained in the position shown in full lines by the catches 29 and 30 which when the operating handle 21 is actuated are moved by means of the links 31 and 32 to release the two portions of the seat which due to their own weight and the weight of the aviator's body or assisted by suitable springs then fall automatically into the position shown in broken chain lines.

The pilot is secured to the seat by means of the straps 33 forming part of the harness by means of which he is attached to the parachute, said straps having eyes 34 which are engaged by the hook shaped catches 35 positively secured to the portion 12 of the seat.

The operation of this form of my invention will be understood from an inspection of Fig. 6 in conjunction with the diagrams illustrated in Fig. 7 which represent the successive stages of projection and expansion of a parachute under this invention from an aeroplane in flight. When the pilot in order to release himself from the aeroplane in an emergency actuates the lever 21 the rod 20 and links 19 and 27 will be simultaneously operated and compressed air from the reservoir 25 will be admitted to the container 1; the catch 18 will release the door 16 which will fall into the operative position indicated in broken chain lines the shock of its opening movement being broken by the cord or the like 36 and spring 37.

Due to the opening of the cock 26 air under pressure is admitted from the reservoir 25 to the container 1 and at the same time the body of air resisting the aeroplane in its flight together with the propeller air current will be collected by the projecting flap or door 16 and conducted to the interior of the container 1 thereby augmenting the air under pressure flowing from the reservoir 25 and assisting in the projection of the parachute body and its associated parts from the container. The nested parachute is preferably provided with light caps 38 and 38' so that the body of the parachute and the rigging which latter is inclosed by the cap 38' will be ejected from the container in mass. The lower cap 38' is connected to the ring or other fitting to which the ends of the rigging tapes or the like 39 are secured and to which ring also the main suspension rope 13 is attached so that when this latter is fully extended the rigging 39 and parachute body will continue their upward travel in the body however remaining substantially in bulk until it is arrested by the sudden strain exerted through the rigging 39 by the resistance of the weight of the aviator and as at this moment the rigging will be in tension the cap 38 will be thrown off and the parachute cover will "break" and expand.

Contemporaneously with the above described operations effected by the manipulation of the lever 21 the rods 31 and 32 will also be actuated to withdraw the catches 29 and 30 from engagement with the portions 12 and 12' of the pilot's seat which portions will then fall into the inclined position indicated by the broken chain lines in Fig. 6 a stop 40 being provided to limit the movement of the portion 12' of the seat. At the same time the hook shaped catches 35 will be disengaged from the eyes 34 thus disconnecting the aviator from the machine. It will thus be seen that the operation of the parts so far described results in causing the parachute to be ejected from its container and also causing the aviator to assume a position in which the ejected parachute will exert a direct pull upon him through the shock absorber 14.

The progressive stages of operation of a parachute ejected by the launching device hereinbefore described will be readily understood from the diagrams constituting Fig. 7. A indicates the normal position and B the position when the aviator has manipulated the operating lever 21 to cause the parachute to be ejected from its container and the seat to be inclined as above described. Diagram C illustrates a further stage in the projection of the parachute body which is still substantially in mass with the cap 38 in position. Diagram D represents the parachute with the rigging extended and the parachute body arrested by the sudden strain exerted thereon by the weight of the aviator and the cap 38 thrown off to allow of the subsequent full expansion of the parachute body. It will be observed that in this stage the mouth of the parachute is open to receive the current of air projected through the container 1 and that between the positions indicated in diagrams C and D the parachute body has to pass through the air current x issuing from the container 1. In the next stage illustrated by diagram E the expansion of the parachute body is further developed and the shock absorbing device 14 is shown as being extended and transmitting the pull of the parachute to the aviator who is thus easily and smoothly drawn from the inclined position in which he lies. Diagram F represents the aviator dragged completely from his seat free of the aeroplane and it should here be noted that in this stage of operations an important function is performed by the container 1 and its air collecting flap 16, for although the supply of compressed air in the reservoir 25 will have been exhausted by this time air will continue to be collected by the flap 16 and conducted to the container 1 from which it will issue in a strong blast and serve as a cushion for the aviator who will thus be prevented from fouling the fuselage during that short interval of time when he is free of the seat and the rear of the fuselage passes away from him due to the forward flight of the aeroplane as illustrated in diagram G.

It will be appreciated that a parachute launching device under this invention provides a safe and efficient means whereby the aviator may descend safely to the ground in the event of an accident to the aeroplane in which he is seated and an important advantage attendant on its use is that it may be operated at any height above ground level and does not require that the aeroplane shall be at a considerable elevation as is the case where a parachute has to be dropped.

What I claim and desire to secure by Letters Patent of the United States is:—

1. In a parachute launching device the combination with a container on the aircraft, of a parachute body and its associated parts, means for attaching the parachute to the airman or aviator and means whereby, without the employment of an injection device, the body of air resisting the aircraft in its flight effects or assists the ejection of the said parachute body and its associated parts nested in said container and the detachment or withdrawal of the aviator from the aircraft.

2. In a parachute launching device the combination with a container on the aircraft, of a parachute body and its associated parts nested in said container, means for attaching the parachute to the airman or aviator, means comprising a hinged device associated with the said container and operating without the employment of an injection device for collecting and conducting air to the container as the aircraft travels through the atmosphere, and means for rendering said air collecting and conducting means operative.

3. In a parachute launching device, the combination with a container on the aircraft, of a parachute body and its associated parts nested in said container, means for attaching the parachute to the airman, means comprising a hinged device associated with the said container and operating without the employment of an injection device for collecting and conducting air to the container as the aircraft travels through the atmosphere, a compressed air reservoir, and an operating handle or lever for actuating the air blast from said reservoir and the said air collecting and conducting means, and means actuated by the aforesaid handle or lever for simultaneously releasing the aviator from his seat so that the said aviator assumes a position in which the ejected parachute will exert a direct pull upon the said aviator.

4. In a parachute launching device, the combination with a container on the aircraft, of a parachute body and its associated parts nested in said container, means for attaching the aviator to the aircraft and for attaching the parachute to the aviator, a hinged door or flap beneath the container and normally forming part of the bottom of the fuselage, a compressed air reservoir, means for conducting compressed air from said reservoir to the container, means for simultaneously admitting a blast of air from the reservoir to the said container for projecting the door or flap, to adapt the same for collecting and conducting air to the container to augment said blast of compressed air for ejecting the parachute body and its associated parts, and for releasing the connection of the aviator with the aircraft so that the aviator assumes a position in which a direct pull will be exerted upon him by the ejected parachute.

5. In a parachute launching device, the combination with a container on the aircraft, of a parachute body and its associated parts nested in said container, means for attaching the aviator to the aircraft and for attaching the parachute to the aviator, a two part seat for the aviator, a hinged device for collecting and conducting air to the container without the employment of an injection device, a compressed air reservoir, means for operatively connecting the said reservoir with the container, and means for operating the aviator's seat to automatically cause the parts to assume a position in which the aviator will be subjected to a direct pull by the ejected parachute body.

6. In a parachute launching device, the combination with the aircraft, of a container, a hinged air collecting and conducting device on said container, a parachute body and its associated parts nested in the container, means for attaching the parachute to the aviator, a two part seat, means for attaching the aviator to the said seat, a compressed air reservoir, a tubular connection between the reservoir and the container, an operating handle or lever and connections from said lever to the hinged air collecting and conducting device, to the compressed air reservoir, and to each part of the seat so as to simultaneously operate all the respective mechanisms or devices and effect the ejection of the parachute and the detachment and withdrawal of the aviator from the aircraft.

EVERARD RICHARD CALTHROP.

Copies of this patent may be obtained for five cents each, by addressing the "Commissioner of Patents, Washington, D. C."